US011032436B2

(12) United States Patent
Horie et al.

(10) Patent No.: US 11,032,436 B2
(45) Date of Patent: Jun. 8, 2021

(54) INFORMATION PROCESSING APPARATUS, INFORMATION PROCESSING SYSTEM, AND NON-TRANSITORY COMPUTER READABLE MEDIUM STORING PROGRAM FOR WORKFLOW GENERATION

(71) Applicant: FUJI XEROX CO., LTD., Tokyo (JP)

(72) Inventors: Daigo Horie, Kanagawa (JP); Junichi Shimizu, Kanagawa (JP); Kunihiko Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/716,465

(22) Filed: Dec. 16, 2019

(65) Prior Publication Data
US 2020/0336609 A1   Oct. 22, 2020

(30) Foreign Application Priority Data

Apr. 22, 2019 (JP) .............................. JP2019-081344

(51) Int. Cl.
*H04N 1/00* (2006.01)
*G06F 3/12* (2006.01)

(52) U.S. Cl.
CPC ....... *H04N 1/00212* (2013.01); *G06F 3/1207* (2013.01); *G06F 3/1275* (2013.01); *G06F 3/1296* (2013.01); *H04N 1/00222* (2013.01)

(58) Field of Classification Search
None
See application file for complete search history.

(56) References Cited

U.S. PATENT DOCUMENTS

| 2008/0030770 A1* | 2/2008 | Nishioka | G06F 3/1217 358/1.15 |
| 2008/0030781 A1* | 2/2008 | Iwase | H04N 1/00233 358/1.16 |
| 2014/0071487 A1 | 3/2014 | Sato | |

FOREIGN PATENT DOCUMENTS

| JP | 2009157566 A | * | 7/2009 |
| JP | 2012179907 A | * | 9/2012 |
| JP | 2014056488 |  | 3/2014 |

OTHER PUBLICATIONS

English translation of Japanese Application 2007-333956 (corresponding to Japanese Publication 2009-157566) (Kowaka). (Year: 2007).*
English translation of Japanese Application 2012-087920 (corresponding to Japanese Publication 2012-179907) (Koike). (Year: 2012).*

* cited by examiner

*Primary Examiner* — Thomas D Lee
(74) *Attorney, Agent, or Firm* — JCIPRNET

(57) ABSTRACT

An information processing apparatus includes an execution unit that executes a first job and a second job in response to reception of the first job and the second job, and a control unit that controls state of the first job and the second job, in which in a case where the first job includes transferring first data as a processing target to an external apparatus and receiving second data as a processing result from the external apparatus, the control unit sets the first job to a stoppage state in response to completion of the transfer of the first data and sets the second job which uses a transfer protocol used in the first job to an execution available state.

20 Claims, 16 Drawing Sheets

FIG. 5

MANAGEMENT TABLE OF TRANSFER JOB

| PRIORITY RANK | JOB ID | TRANSFER PROTOCOL | TRANSFER DESTINATION AND STORAGE DESTINATION | EXECUTION STATE |
|---|---|---|---|---|
| 1 | ABCDE | SMB/FTP | http://www.xxx/folder1.html | IN-EXECUTION |
| 2 | BCDEF | SMB | http://www.xxx/folder1.html | EXECUTION WAIT |
| 3 | CDEFG | FTP | | EXECUTION WAIT |
| 4 | DEFGH | SMB | http://www.xxx/folder2.html | EXECUTION WAIT |

FIG. 14

MANAGEMENT TABLE OF TRANSFER JOB

| RECEPTION ORDER | JOB ID | TRANSFER PROTOCOL | TRANSFER DESTINATION AND STORAGE DESTINATION | EXECUTION STATE |
|---|---|---|---|---|
| 1 | ABCDE | SMB/FTP | http://www.xxx/folder1.html | STOPPAGE |
| 2 | BCDEF | SMB | http://www.xxx/folder1.html | IN-EXECUTION |
| 3 | CDEFG | FTP | | IN-EXECUTION |
| 4 | DEFGH | SMB | http://www.xxx/folder2.html | EXECUTION WAIT |

FIG. 17

MANAGEMENT TABLE OF TRANSFER JOB

| RECEPTION ORDER | JOB ID | TRANSFER PROTOCOL | TRANSFER DESTINATION AND STORAGE DESTINATION | EXECUTION STATE |
|---|---|---|---|---|
| 1 | ABCDE | SMB/FTP | http://www.xxx/folder1.html | RESUMPTION WAIT |
| 2 | BCDEF | SMB | http://www.xxx/folder1.html | IN-EXECUTION |
| 3 | CDEFG | FTP | | IN-EXECUTION |
| 4 | DEFGH | SMB | http://www.xxx/folder2.html | EXECUTION WAIT |

INFORMATION PROCESSING APPARATUS, INFORMATION PROCESSING SYSTEM, AND NON-TRANSITORY COMPUTER READABLE MEDIUM STORING PROGRAM FOR WORKFLOW GENERATION

CROSS-REFERENCE TO RELATED APPLICATIONS

This application is based on and claims priority under 35 USC 119 from Japanese Patent Application No. 2019-081344 filed Apr. 22, 2019.

BACKGROUND

(i) Technical Field

The present invention relates to an information processing apparatus, an information processing system, and a non-transitory computer readable medium storing a program.

(ii) Related Art

JP2014-056488A discloses a workflow generation apparatus that generates a workflow configured with a plurality of steps. The workflow generation apparatus includes identification means that identifies whether an execution location of each of one or more processes constituting the step is a device or a cloud, rearrangement means that rearranges a process order such that a plurality of processes of which the execution locations are identified as the cloud by the identification means are collectively called, and generation means that generates the workflow by collecting a plurality of processes of which the execution locations are identified as the cloud by the identification means and which are consecutively arranged as a result of the rearrangement by the rearrangement means.

SUMMARY

In an information processing apparatus such as an image forming apparatus having a plurality of service functions, for example, in a case where a request for a transfer process is made, image data is acquired, and the acquired image data is transferred to a storage destination. Image processing such as a text recognition process may be performed on the acquired image data, and the post image processing image data may be transferred to the storage destination.

The information processing apparatus may request a server in the cloud to perform a part or the whole of a process such as the image processing before transfer. Hereinafter, a unit of a process that a user requests the information processing apparatus to perform will be referred to as a "job".

In the related art, during execution of a first job that uses a certain transfer protocol, the information processing apparatus does not execute a second job that uses the same transfer protocol in order to guarantee a processing result. In a case where the processing result of the image processing returns to the information processing apparatus from the server in the cloud, the information processing apparatus may not start the second job until the first job is finished.

Aspects of non-limiting embodiments of the present disclosure relate to an information processing apparatus, an information processing system, and a non-transitory computer readable medium storing a program capable of starting a second job that uses the same transfer protocol before a first job received earlier is finished, in a case of receiving a job including transfer of data to an external apparatus and executing the job.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an execution unit that executes a first job and a second job in response to reception of the first job and the second job, and a control unit that controls state of the first job and the second job, in which in a case where the first job includes transferring first data as a processing target to an external apparatus and receiving second data as a processing result from the external apparatus, the control unit sets the first job to a stoppage state in response to completion of the transfer of the first data and sets the second job which uses a transfer protocol used in the first job to an execution available state.

BRIEF DESCRIPTION OF THE DRAWINGS

Exemplary embodiment(s) of the present invention will be described in detail based on the following figures, wherein:

FIG. 5 is a diagram illustrating one example of a management table of the transfer process;

FIG. 14 is a diagram illustrating an example of update of the management table;

FIG. 17 is a diagram illustrating an example of update of the management table.

DETAILED DESCRIPTION

Hereinafter, one example of an exemplary embodiment of the present invention will be described in detail with reference to the drawings.

Information Processing System

Figure 1:
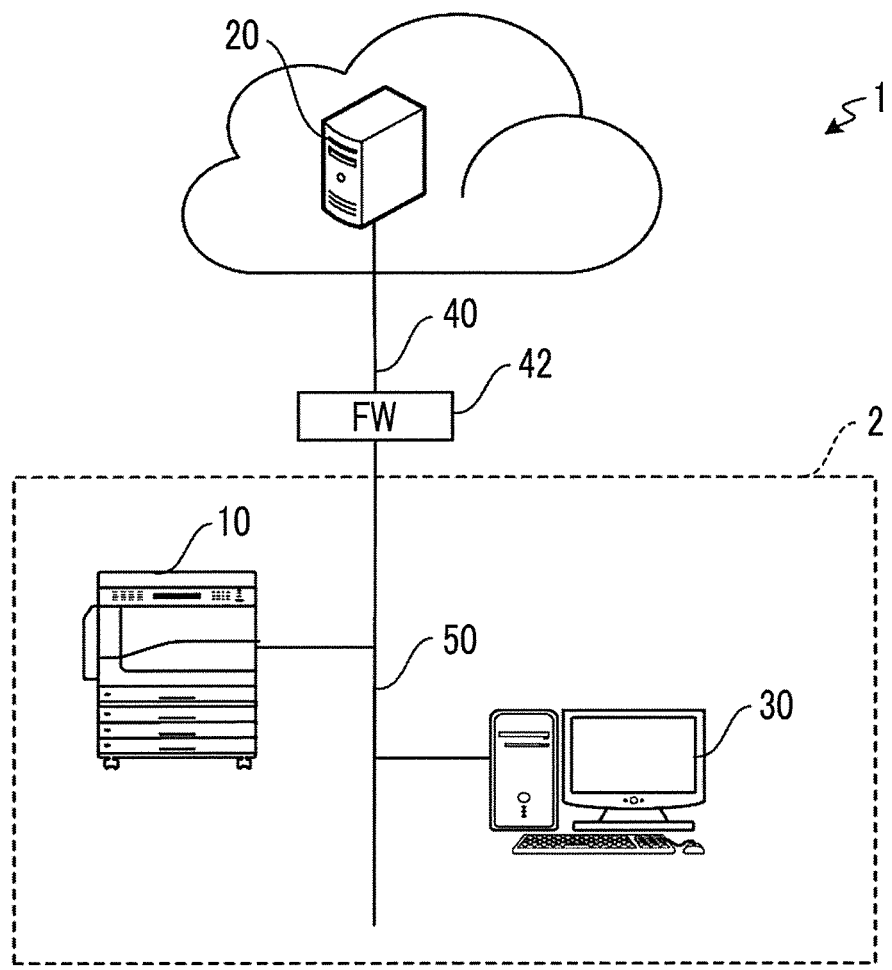
FIG. 1 is a schematic diagram illustrating one example of a configuration of an information processing system according to an exemplary embodiment of the present invention.

First, an information processing system will be described. FIG. 1 is a schematic diagram illustrating one example of a configuration of an information processing system according to the exemplary embodiment of the present invention. As illustrated in FIG. 1, an information processing system 1 includes an information processing apparatus 10, an image processing server 20, and a document management server 30. The image processing server 20 is one example of an external apparatus and is a virtual server that is arranged in a cloud. Each of the information processing apparatus 10 and the document management server 30 is arranged in a system 2. The system 2 is an on-premise system such as a dedicated intracompany system.

The information processing apparatus 10 and the document management server 30 are connected through an on-premise communication line 50 such as an intracompany LAN. In addition, each of the information processing apparatus 10 and the document management server 30 is connected to the image processing server 20 in the cloud through a communication line 40 such as the Internet and a firewall 42. The firewall 42 blocks external unpermitted communication with the on-premise system 2.

The information processing apparatus 10 has a transfer function of acquiring image data from a storage device and the like and transferring the acquired image data to a designated recipient in accordance with an instruction from a user. In the present exemplary embodiment, an image forming apparatus that has the transfer function, a scan function of acquiring image data by reading an image of an original document, an image processing function of performing various image processing on the acquired image data, and the like is used as the information processing apparatus 10.

The information processing apparatus 10 receives a request for a process from the user and executes the received process. The image processing server 20 is an information processing apparatus that provides an image processing service. The image processing performed by the image processing server 20 is exemplified by a text recognition process, a form determination process, and the like. The text recognition process is a process of performing text recognition on the image data read from the original document. The form determination process is a process of performing text recognition on image data read from a form and extracting a value corresponding to each field using the result of the text recognition.

In the present exemplary embodiment, the information processing apparatus 10 requests the image processing server 20 to perform a part or the whole of the image processing in the received process. In the requesting for the image processing, the information processing apparatus 10 transfers the image data to the image processing server 20. The image processing server 20 receives the request for the image processing from the information processing apparatus 10 and executes the image processing on the transferred image data.

The information processing apparatus 10 acquires the result of the image processing from the image processing server 20. For example, in the case of the text recognition process, the result of the image processing includes a recognized text string and post image processing image data in which the text string is associated with each region.

The document management server 30 is an information processing apparatus that provides a service for storing and managing a computerized document such as the image data. The user may designate a server as a transfer destination by an IP address or a host name. The user may designate a folder as a storage destination by a folder name. In a case where the document management server 30 is designated as the transfer destination, the information processing apparatus 10 transfers the result of the image processing acquired from the image processing server 20 to the document management server 30. The result of the image processing is stored in the folder designated as the storage destination.

In the present exemplary embodiment, the image processing server 20 is arranged as the external apparatus. However, the external apparatus is not limited to a server providing an image processing service. The external apparatus may be a server providing other processing services as long as the server is a request destination for a part of the process received by the information processing apparatus 10.

Information Processing Apparatus

Figure 2:
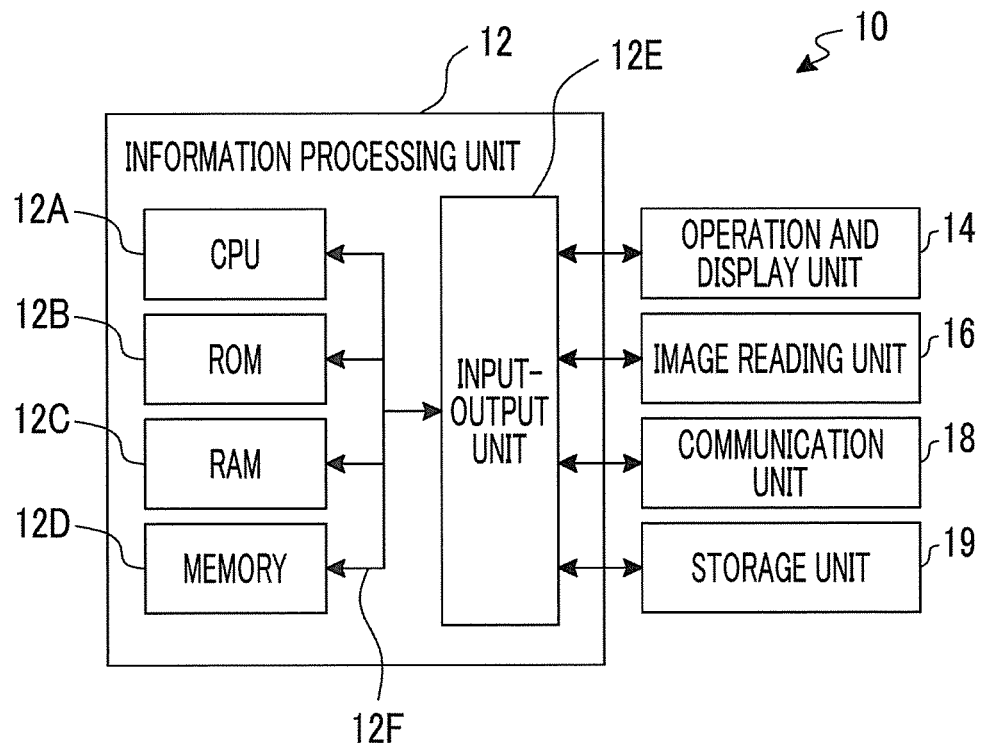
FIG. 2 is a block diagram illustrating one example of an electric configuration of an information processing apparatus.

FIG. 2 is a block diagram illustrating one example of an electric configuration of the information processing apparatus. The information processing apparatus 10 includes an information processing unit 12 that is a computer controlling the whole apparatus and performing various calculations. The information processing unit 12 includes a CPU 12A, a ROM 12B storing various programs, a RAM 12C used as a work area at the time of executing the programs, a non-volatile memory 12D, and an input-output unit 12E. The CPU 12A, the ROM 12B, the RAM 12C, the memory 12D, and the input-output unit 12E are connected to each other through a bus 12F. The information processing unit 12 is one example of an execution unit that executes a job, and is one example of a control unit.

The information processing apparatus 10 includes an operation and display unit 14, an image reading unit 16, a communication unit 18, and a storage unit 19. The operation and display unit 14 is an interface for displaying various information to the user and receiving operations from the user. The image reading unit 16 is a device such as a scanner that optically reads an image recorded on the original document. The communication unit 18 is an interface for communicating with the external apparatus. The storage unit 19 is an external storage device such as a hard disk. Each of the operation and display unit 14, the image reading unit 16, the communication unit 18, and the storage unit 19 is connected to the input-output unit 12E. The information processing unit 12 controls each unit by exchanging information with each unit.

In the present exemplary embodiment, a control program fora "transfer control process" and a "transfer job resumption process" described later is stored in the ROM 12B of the information processing unit 12. In addition, a "management table" described later is stored in the memory 12D. Various programs and various data may be stored in other storage devices inside or outside the apparatus or may be recorded on a recording medium such as a CD-ROM. In addition, various programs and various data may be acquired through communication.

Image Processing Server

Figure 3:
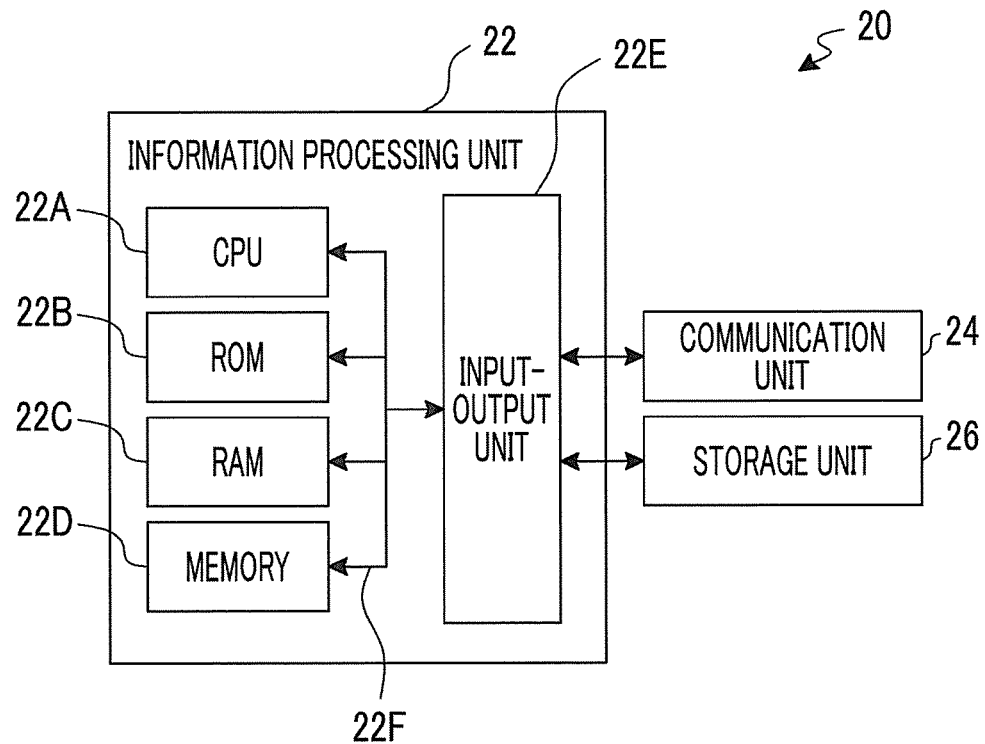
FIG. 3 is a block diagram illustrating one example of an electric configuration of an image processing server.

FIG. 3 is a block diagram illustrating one example of an electric configuration of the image processing server.

The image processing server 20 includes an information processing unit 22 that is a computer controlling the whole apparatus and performing various calculations. The information processing unit 22 includes a CPU 22A, a ROM 22B, a RAM 22C, a memory 22D, and an input-output unit 22E. The CPU 22A, the ROM 22B, the RAM 22C, the memory 22D, and the input-output unit 22E are connected to each other through a bus 22F.

The image processing server 20 includes a communication unit 24 and a storage unit 26. The communication unit 24 is an interface for communicating with the external apparatus. The storage unit 26 is an external storage device such as a hard disk. Each of the communication unit 24 and the storage unit 26 is connected to the input-output unit 22E. The information processing unit 22 controls each unit by exchanging information with each unit.

The document management server 30 is an information processing apparatus that provides the same service as the image processing server 20, and has the same electric configuration as the image processing server 20. A description of the document management server 30 will not be provided.

Management of Transfer Process

Next, a transfer process will be described.

In a case where the information processing apparatus 10 receives a job (hereinafter, referred to as a "transfer job") that includes transfer of data to the external apparatus, the information processing apparatus 10 executes the received transfer job using a transfer protocol corresponding to the content of the process.

The transfer job includes a job that uses only the "transfer function" of the information processing apparatus 10, and also a complex job that uses the transfer function and other functions in combination. For example, the complex job is a process of acquiring the image data, performing the image processing on the acquired image data, and transferring the result of the image processing to the storage destination.

The transfer protocol is a protocol used in file transfer. The transfer protocol is a communication protocol that is defined for an application layer. For example, a server message block (SMB), a file transfer protocol (FTP), and a Web-based distributed authoring and versioning (Web DAV) are used as the transfer protocol.

Figure 4:
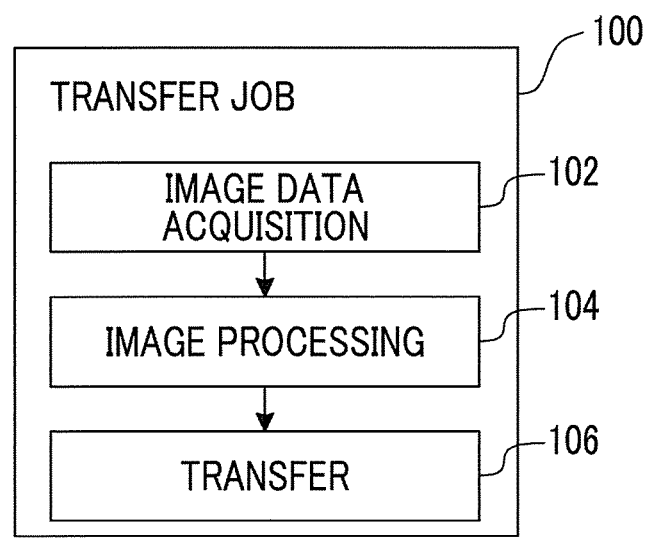
FIG. 4 is a flowchart illustrating one example of a flow of transfer process.

FIG. 4 is a flowchart illustrating one example of a flow of transfer job. A transfer job 100 includes a data acquisition step 102 of acquiring the image data from the storage device, an image processing step 104 of performing the image processing on the acquired image data, and a transfer step 106 of transferring the result of the image processing to the designated transfer destination. As described above, the transfer job may not include the image processing step.

In the present exemplary embodiment, the request for the process is made by a job order. In the job order, the content of the process is specifically defined by designating the apparatus. The job order includes a job identifier (hereinafter, abbreviated to a job ID) for identifying the transfer job. Hereinafter, the content of the process defined in the job order will be illustrated. This example is one example of the content of the process that the information processing apparatus 10 is requested to perform.

(1) Image data as a processing target is acquired from a storage device A storing a reading result of a scanner.

(2) The text recognition process is performed on the image data by an image processing server B.

(3) The image data and the result of the text recognition process are stored in a document management server C.

Next, management of the transfer job will be described.

FIG. 5 is a diagram illustrating one example of a management table of the transfer job. In a case where the information processing apparatus 10 receives the request for the transfer job, the information processing apparatus 10 generates the job ID, decides the transfer protocol to be used in the transfer job, and registers job information in the management table.

For example, the job information includes the job ID, the transfer protocol, information representing the transfer destination and the storage destination, and information representing an execution state. The transfer job has a plurality of execution states such as an in-execution state and an execution wait state. In the present exemplary embodiment, new execution states such as a "stoppage" state and a "resumption wait" state are added in addition to the in-execution state and the execution wait state. The stoppage state and the resumption wait state will be described later.

In a case where the transfer job is finished, the job information is deleted from the management table. The information processing apparatus 10 manages the execution state of the transfer job from the registration of the job information in the management table until the deletion of the job information.

The information processing apparatus 10 manages the transfer job based on a rule that a plurality of transfer jobs that use the same transfer protocol may not be executed at the same time. In the "in-execution" state of the transfer job that uses a certain transfer protocol, another transfer job that uses the same transfer protocol may not be executed and enters the "execution wait" state.

In the related art, the information processing apparatus 10 executes each transfer job under management in order of request reception. For example, in a case where an interconnection process of a subsequent stage that is started in a case where a file is stored in the server by the transfer job is present, and the process order of the interconnection process of the subsequent stage may not be changed, it is necessary to guarantee the order such that execution is performed in order of request reception.

For example, as illustrated in FIG. 5, the information processing apparatus 10 assigns a priority rank to each transfer job under management in order of request reception and executes each transfer job in order of highest to lowest priority rank. In a case where the transfer job is finished, and the job information is deleted, the priority ranks of other transfer jobs are increased by one.

In the example illustrated in FIG. 5, a transfer job (ABCDE) of priority rank 1 uses SMB/FTP. Thus, each of a transfer job (BCDEF) of priority rank 2 using SMB, a transfer job (CDEFG) of priority rank 3 using FTP, and a transfer job (DEFGH) of priority rank 4 using SMB/FTP is not executed and enters the "execution wait" state.

Next, in a case where the transfer job (BCDEF) of priority rank 2 enters the in-execution state, the transfer job (DEFGH) of priority rank 4 using SMB is not executed and enters the "execution wait" state. The transfer job (CDEFG) of priority rank 3 using FTP does not have a preceding transfer job using FTP. Thus, the transfer job (CDEFG) of priority rank 3 is executed and enters the "in-execution" state.

Making Request for Image Processing to Cloud

Next, making the request for the image processing to the cloud will be described.

In a case where the transfer job includes the image processing step (refer to FIG. 4), the information processing apparatus 10 may request the image processing server 20 in the cloud to perform a part or the whole of the image processing.

Whether or not to make the request to the image processing server 20 is decided from various viewpoints. For example, the information processing apparatus 10 may perform image processing of a function included in the information processing apparatus 10 and request the image processing server 20 to perform image processing of a function not included in the information processing apparatus 10. A function having a high added value like image processing using machine learning uses a large amount of consumption of resources such as the CPU and the memory. Thus, such a function is arranged outside the cloud and the like.

In the present exemplary embodiment, an instruction to request the image processing server 20 to perform a part or the whole of the image processing is provided by the job order received by the information processing apparatus 10. Requesting the image processing server 20 to perform the image processing is also performed by the job order. The job order for requesting the image processing includes the image data as a processing target, the job ID, and a requested process content.

Figure 6:
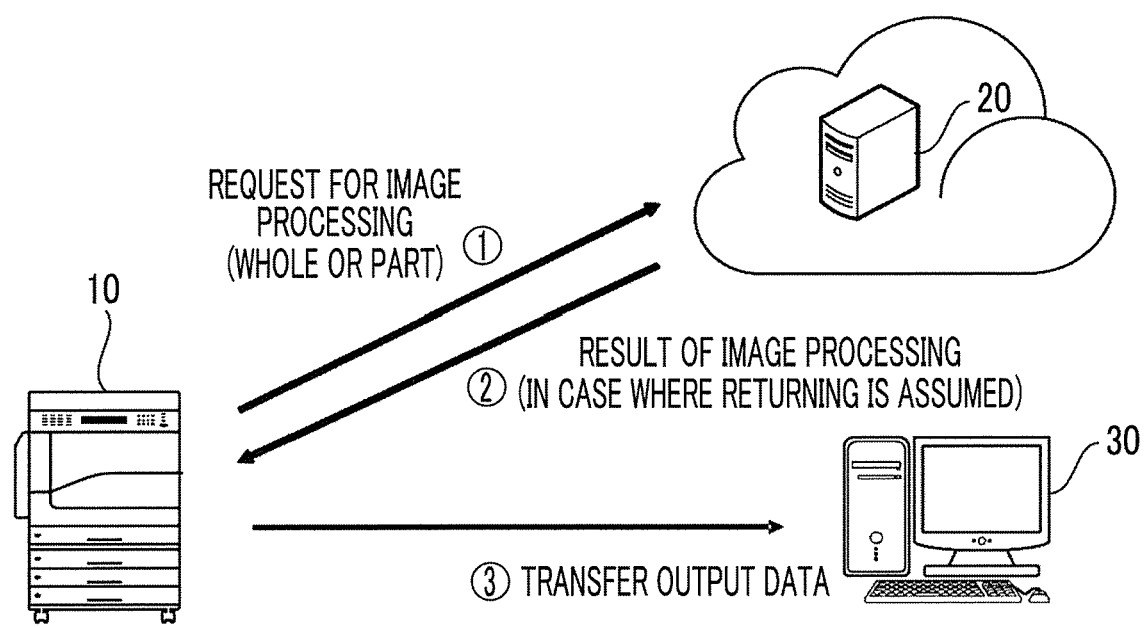
FIG. 6 is a schematic diagram for describing operation of the information processing system based on an assumption.

In the related art, in a case where the image processing is performed in the cloud, the result of the image processing is stored in the cloud. FIG. 6 is a schematic diagram for describing the operation of the information processing system based on an assumption. As illustrated in FIG. 6, in the present exemplary embodiment, it is assumed that the information processing apparatus 10 performs an operation of requesting the image processing server 20 in the cloud to perform the image processing and acquiring the result of the image processing from the image processing server 20 in the cloud.

As described above, the image processing server 20 receives the request for the image processing by the job order from the information processing apparatus 10 and executes the image processing in accordance with the job order. The information processing apparatus 10 acquires the result of the image processing from the image processing server 20. The information processing apparatus 10 generates output data from the acquired result of the image processing. The information processing apparatus 10 transfers the generated output data to the document management server 30.

In a case where an operation of returning the result of the image processing is assumed, and the order is guaranteed, the information processing apparatus 10 may not execute the subsequent transfer job using the same protocol until the preceding transfer job including the image processing in the cloud is finished. A transfer job that does not perform the image processing is also not executed in a case where the transfer job uses the same protocol.

Figure 7:
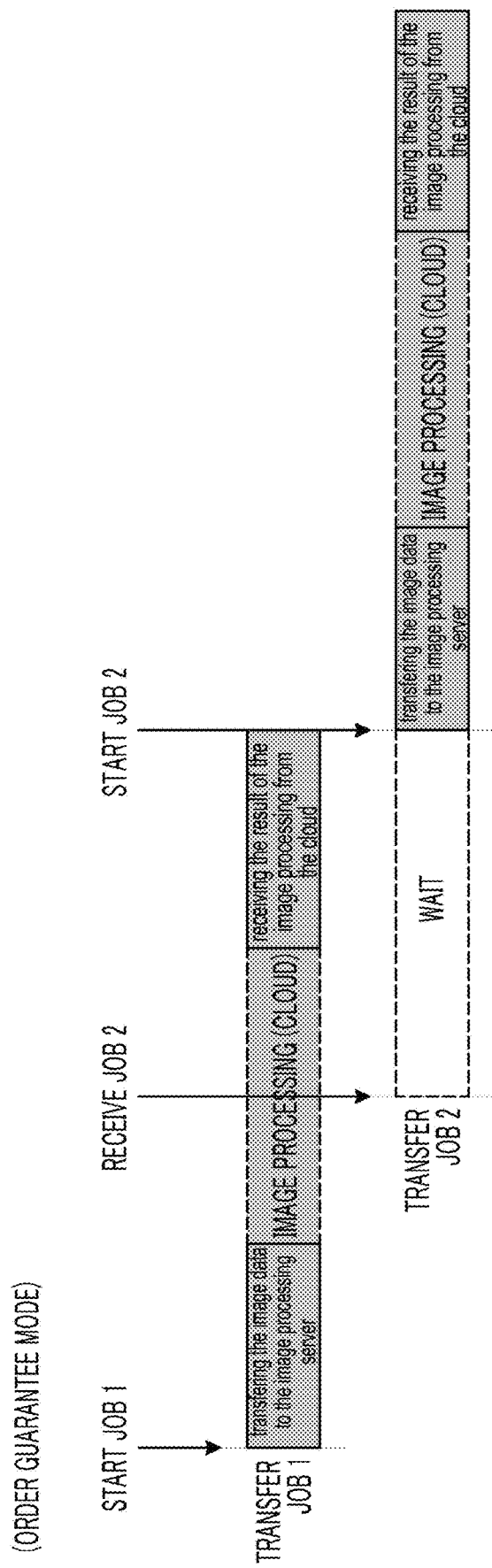
FIG. 7 is a sequence diagram illustrating one example of operation in an order guarantee mode.

FIG. 7 is a sequence diagram illustrating one example of operation in an order guarantee mode. A case where a request for a transfer job 2 using the same transfer protocol is received during execution of a transfer job 1 will be described. Each of the transfer job 1 and the transfer job 2 includes each step of data acquisition, image processing, and transfer. The image processing is executed by the image processing server 20 in the cloud.

As described above, a plurality of transfer jobs using the same transfer protocol are not executed at the same time. After the information processing apparatus 10 makes the request for the image processing of the transfer job 1 to the cloud, the information processing apparatus 10 does not process the transfer job 1 until the result of the image processing is received from the cloud. In a case where the order is guaranteed, the transfer job 2 is not executed until the transfer of the transfer job 1 is finished. A wait time period for starting the transfer job 2 after the request for the transfer job 2 is received is increased.

Therefore, in the present exemplary embodiment, the user who manages the information processing apparatus 10 may select and set one of the order guarantee mode and an interruption mode for the execution order of the transfer jobs. In the order guarantee mode, the transfer jobs are executed in order of request reception. In the interruption mode, the execution order of the transfer jobs is efficiently rearranged. Next, interruption of the transfer job will be described.

Figure 8:
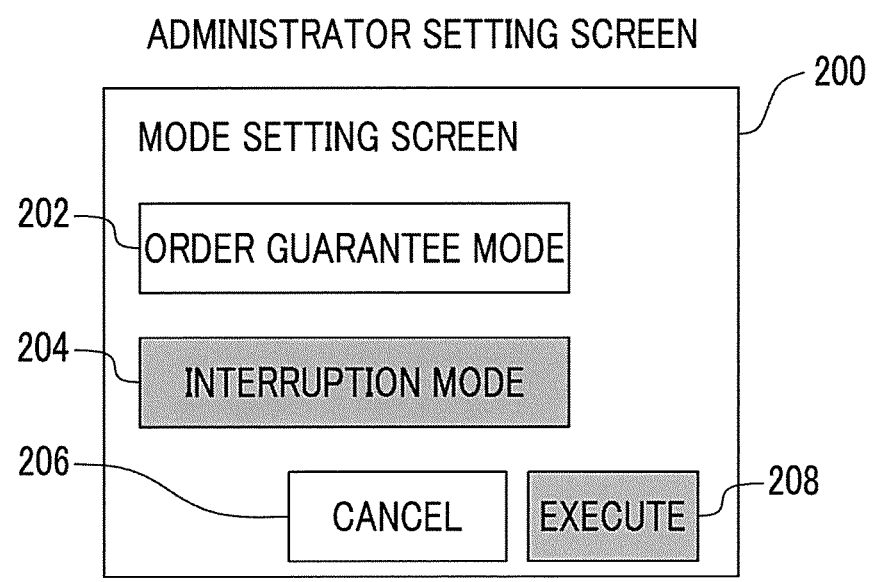
FIG. 8 is a schematic diagram illustrating one example of a mode setting screen.

FIG. 8 is a schematic diagram illustrating one example of a mode setting screen. A mode setting screen 200 is displayed on the operation and display unit 14 of the information processing apparatus 10, and a selection from the user is received. The mode setting screen 200 includes a button 202 for selecting the order guarantee mode, a button 204 for selecting the interruption mode, a button 206 for providing a cancelation instruction, and a button 208 for providing an execution instruction. In a case where the interruption mode is selected by the button 204, and the execution instruction is provided by the button 208, the interruption mode is set.

Interruption of Transfer Job

Next, interruption of the transfer job will be described.

In the interruption mode, the information processing apparatus 10 sets the transfer job in the in-execution state to the stoppage state after the request for the image processing to the cloud is completed. In a case where the transfer of the image data to the image processing server 20 is completed, the request for the image processing to the cloud is completed.

The subsequent transfer job that uses the same transfer protocol as the transfer job in the stoppage state is executed earlier by interrupting the transfer job in the stoppage state. Setting the transfer job to the stoppage state means that communication that uses the transfer protocol is temporarily stopped, and the process content that is processed up to the time point of the stoppage is stored.

Figure 9:
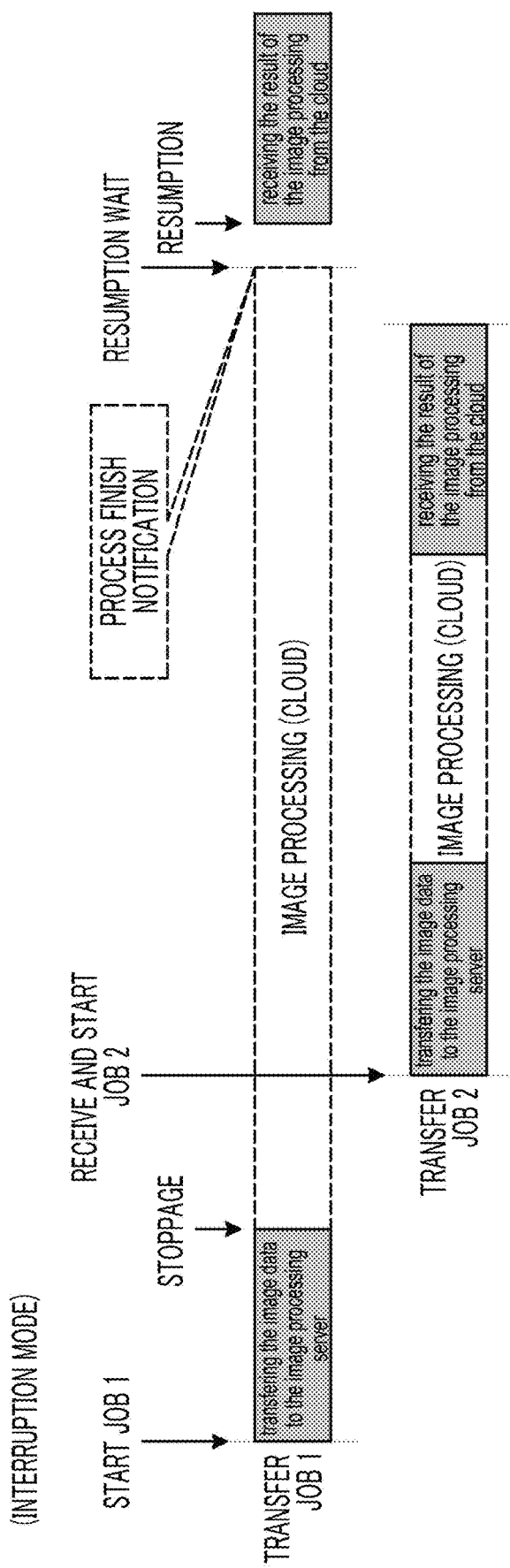
FIG. 9 is a sequence diagram illustrating one example of operation in an interruption mode.

FIG. 9 is a sequence diagram illustrating one example of operation in the interruption mode. The information processing apparatus 10 sets the transfer job 1 to the stoppage state after making the request for the image processing of the transfer job 1 to the cloud. In a case where the request for the transfer job 2 using the same transfer protocol is received during the stoppage of the transfer job 1, the transfer job 2 received later is executed. The wait time period for the transfer job 2 is set to zero. In a case where it takes time to perform the image processing in the cloud, the wait time period for the transfer job 2 is decreased, compared to the wait time period in a case where the order is guaranteed.

In a case where the image processing of the transfer job 1 is finished, the image processing server 20 notifies the information processing apparatus 10 that the image processing is finished. In a case where the information processing apparatus 10 receives the process finish notification from the image processing server 20, the information processing apparatus 10 sets the transfer job 1 to the resumption wait state. After the transfer job 2 is finished, the information processing apparatus 10 resumes the transfer job 1 and returns the transfer job 1 to the in-execution state. The resumption of the transfer job means that communication that uses the transfer protocol is resumed, and the remaining process of the transfer job is executed.

Figure 10:
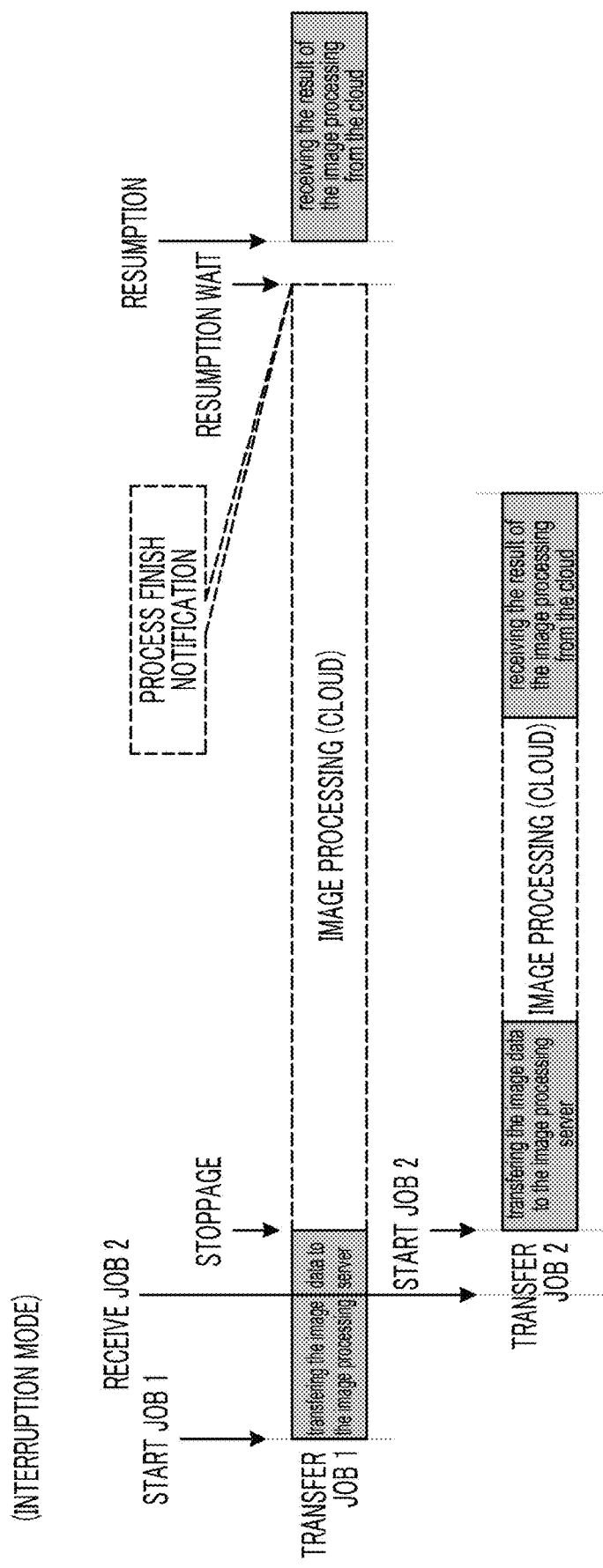
FIG. 10 is a sequence diagram illustrating another example of operation in the interruption mode.

FIG. 10 is a sequence diagram illustrating another example of operation in the interruption mode. As illustrated in FIG. 10, in a case where the transfer job 1 enters the stoppage state after the request for the transfer job 2 is received, the transfer job 2 that is requested later is executed after the transfer job 1 is stopped. In this case, first, the transfer job 2 that is requested later enters the execution wait state and then, enters the in-execution state from the execution wait state.

Transfer Control Process

Operation of Whole System

First, a summary of the operation of the information processing system will be described.

The information processing apparatus 10 transmits the job order including the image data to the image processing server 20 through the communication line 40 and the communication line 50. The information processing apparatus 10 receives the result of the image processing from the image processing server 20 through the communication line 40 and the communication line 50.

In the example illustrated in FIG. 1, a firewall 42 is arranged between the information processing apparatus 10 and the image processing server 20. Thus, the information processing apparatus 10 may not receive the result of the image processing from the image processing server 20 by communication means that transmits the job order. In this case, the result of the image processing is received by changing the communication means such that the result of the image processing is received as an electronic mail or as a content from a Web server.

In the present exemplary embodiment, a Web browser is installed on the information processing apparatus 10. The information processing apparatus 10 accesses a URL notified from the image processing server 20 and receives the content displaying the result of the image processing from the Web server.

Figure 11:
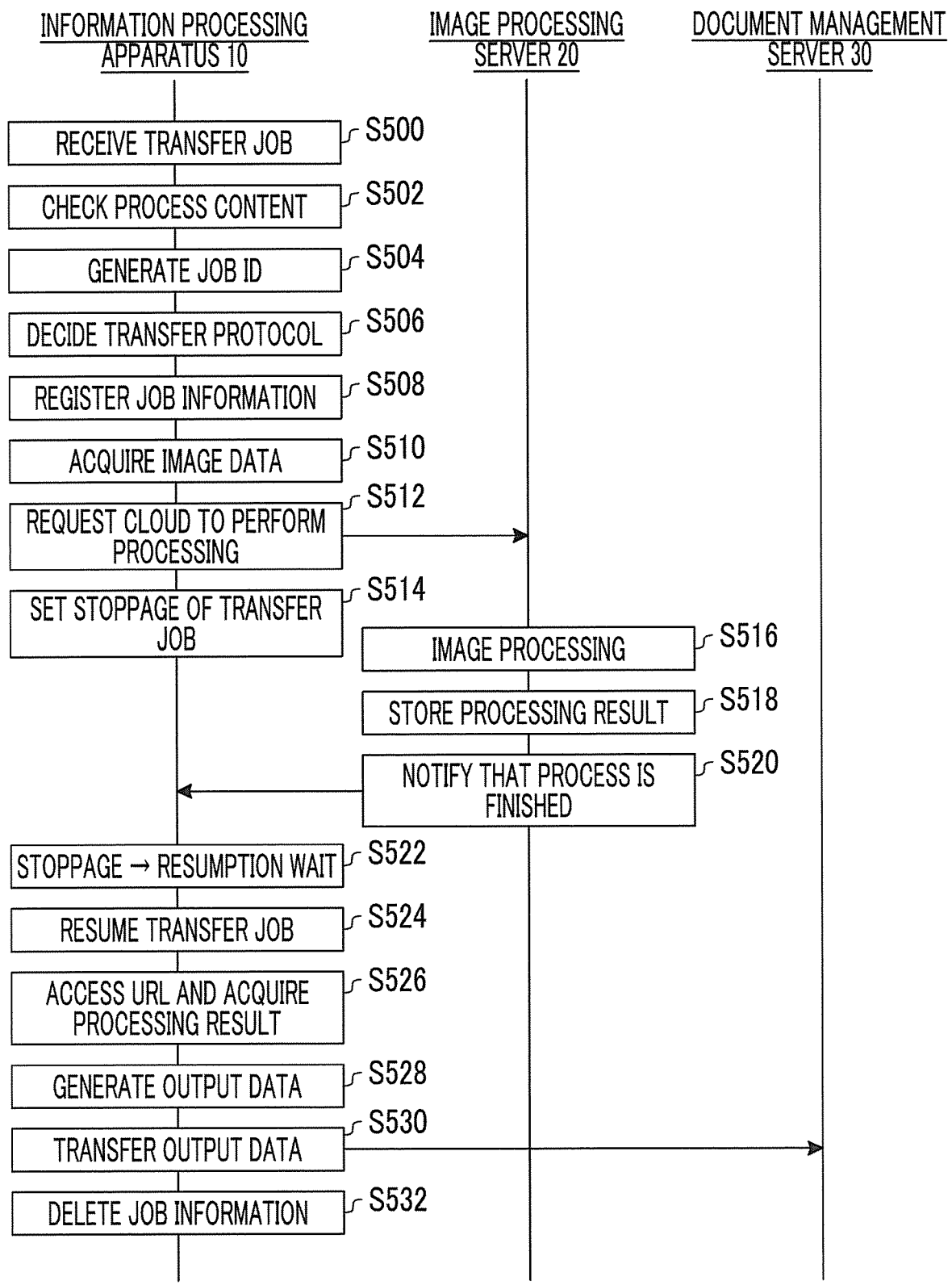
FIG. 11 is a sequence diagram illustrating one example of operation of the information processing system according to the exemplary embodiment of the present invention.

FIG. 11 is a sequence diagram illustrating one example of operation of the information processing system according to the exemplary embodiment of the present invention. First, in step S500, the information processing apparatus 10 receives the request for the transfer job. Next, in step S502, the information processing apparatus 10 checks the process content of the transfer job.

Next, in step S504, the information processing apparatus 10 generates the job ID of the transfer job. Next, in step S506, the information processing apparatus 10 decides the transfer protocol to be used by the transfer job. Next, in step S508, the information processing apparatus 10 registers the job information in the management table.

Next, in step S510, the information processing apparatus 10 acquires the image data from the storage device. Next, in step S512, the information processing apparatus 10 requests the image processing server 20 in the cloud to perform the image processing by transferring the image data to the image processing server 20. Next, in step S514, the information processing apparatus 10 sets the transfer job to the stoppage state.

Next, in step S516, the image processing server 20 executes the image processing. Next, in step S518, the image processing server 20 stores the result of the image processing at the storage destination. Next, in step S520, the image processing server 20 notifies the information processing apparatus 10 that the process is finished by electronic mail. Even in a case where the firewall 42 is arranged, the information processing apparatus 10 may receive the electronic mail transmitted from the image processing server 20.

The job ID and success or failure of the image processing are described in the electronic mail. The success or failure of the image processing indicates whether the image processing succeeds or fails. In a case where the image processing succeeds, the URL of the storage destination at which the result of the image processing is stored is described in the electronic mail. The content of the electronic mail may be encrypted using an encryption technology such as S/MIME. The result of the image processing may be attached to the electronic mail as an attachment file.

Next, in step S522, the information processing apparatus 10 sets the transfer job in the stoppage state to the resumption wait state. Next, in step S524, the information processing apparatus 10 resumes the transfer job in the resumption wait state. Next, in step S526, the information processing apparatus 10 accesses the URL of the storage destination and acquires the result of the image processing.

Next, in step S528, the information processing apparatus 10 generates the output data from the result of the image processing. In a case where a plurality of types of image processing are performed, the output data is generated by combining the results of the plurality of types of image processing. Next, in step S530, the information processing apparatus 10 transfers the output data to the document management server 30. Next, in step S532, the information processing apparatus 10 deletes the job information of the finished transfer job from the management table.

Transfer Control Process

Next, a transfer control process of controlling the execution order of the transfer process will be described.

Figure 12:
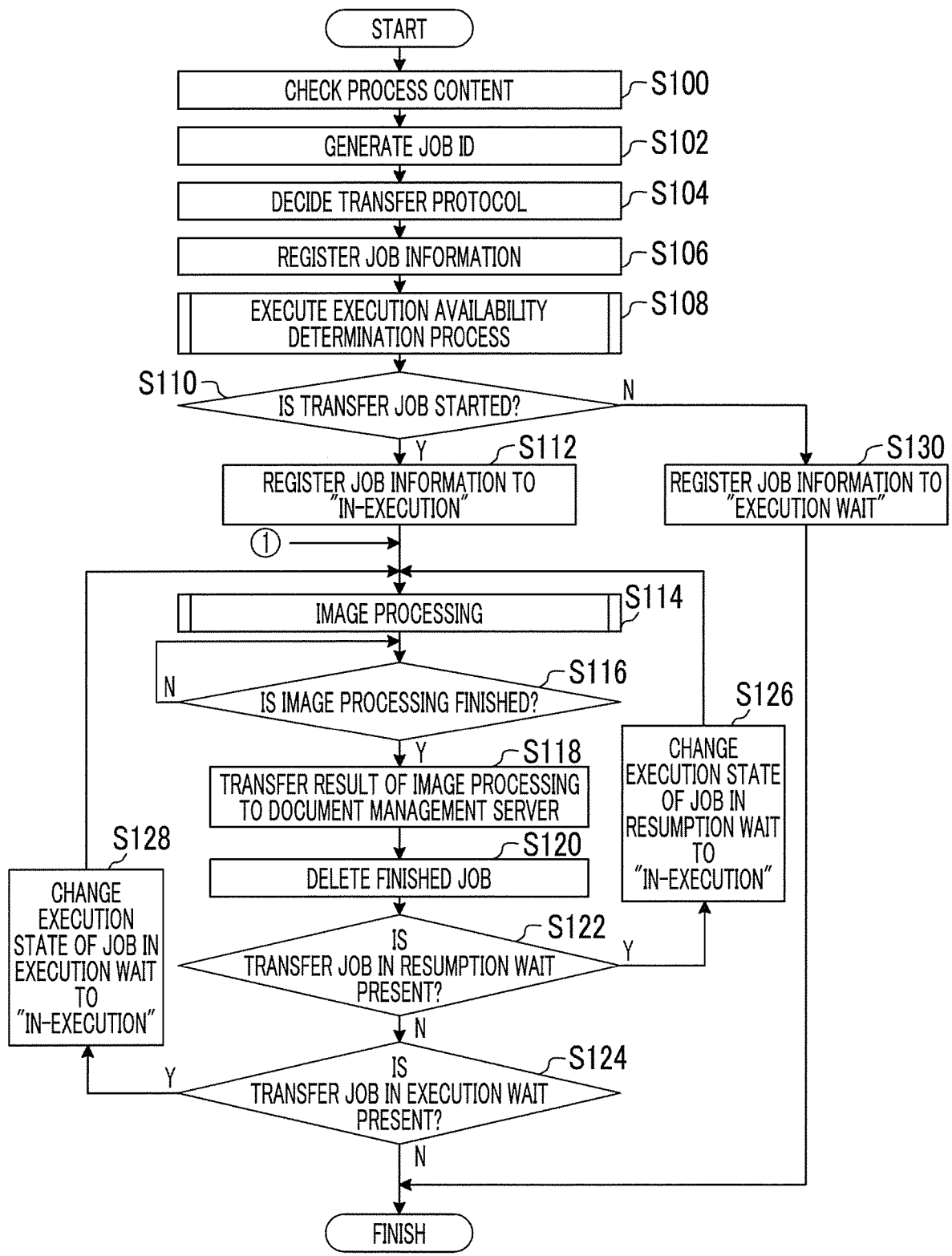
FIG. 12 is a flowchart illustrating one example of a flow of process of a program according to the exemplary embodiment of the present invention.

FIG. 12 is a flowchart illustrating one example of a flow of process of a program according to the exemplary embodiment of the present invention. A program of the transfer control process is read from the ROM 12B and is executed by the CPU 12A of the information processing apparatus 10 (refer to FIG. 2). The program of the transfer control process is started in a case where the request for the transfer job is received.

First, in step S100, the process content of the transfer job described in the job order is checked. Next, in step S102, the job ID of the transfer job is generated. Next, in step S104; the transfer protocol to be used by the transfer job is decided. Next, in step S106, the job information is registered in the management table.

Next, in step S108, an "execution availability determination process" is executed. The "execution availability determination process" is a process of determining whether or not the requested transfer job may be executed in a case where the request for the transfer job is received. In a case where the transfer job may not be executed, an "execution unavailable" determination is made. In a case where the transfer job may be executed, an "execution available" determination is made.

A detailed procedure of the "execution availability determination process" will be described.

Figure 15:
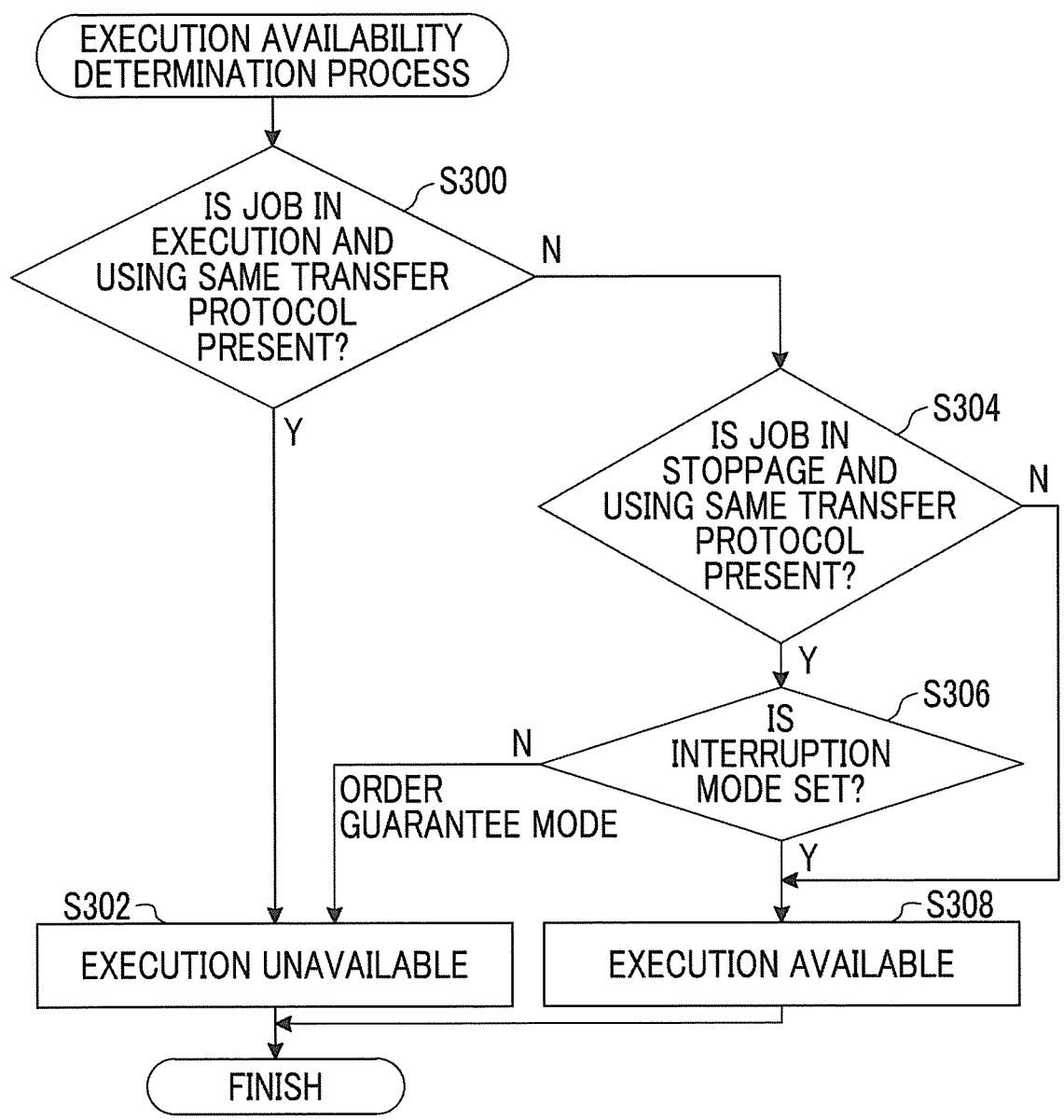
FIG. 15 is a flowchart illustrating one example of a flow of "execution availability determination process"

FIG. 15 is a flowchart illustrating one example of a flow of "execution availability determination process". First, in step S300, a determination as to whether or not the transfer job that is in the in-execution state and uses the same transfer protocol is present is performed. In a case where the transfer job that is in the in-execution state and uses the same transfer protocol is present, a transition is made to step S302. In step S302, the "execution unavailable" determination is made, and the routine is finished.

In a case where the transfer job that is in the in-execution state and uses the same transfer protocol is not present, a transition is made to step S304. In step S304, a determination as to whether or not the transfer job that is in the stoppage state and uses the same transfer protocol is present is performed. In a case where the transfer job that is in the stoppage state and uses the same transfer protocol is not present, a transition is made to step S308. In step S308, the "execution available" determination is made, and the routine is finished.

In step S304, in a case where the transfer job that is in the stoppage state and uses the same transfer protocol is present, a transition is made to step S306. In step S306, a determination as to whether or not the interruption mode is set is performed. In a case where the interruption mode is set, the "execution available" determination is made in step S308, and the routine is finished. In a case where the interruption mode is not set, the order guarantee mode is set. Thus, in step S302, the "execution unavailable" determination is made, and the routine is finished.

FIG. 12 will be described again. Next, in step S110, a determination as to whether or not to start the requested transfer job is performed based on the determination result. In a case where the "execution available" determination is made, the requested transfer job is started. In a case where the "execution unavailable" determination is made, the requested transfer job is not started.

In a case where the transfer job is started, a transition is made to step S112. In step S112, the execution state of the transfer job is set to the "in-execution" state, and the job information of the requested transfer job is registered in the management table. In a case where the transfer job is not started, a transition is made to step S130. In step S130, the execution state of the transfer job is set to the "execution wait" state. The job information of the requested transfer job is registered in the management table, and the routine is finished.

Next, in step S114, the "image processing" is executed. In the present exemplary embodiment, the image processing is executed in a plurality of steps. Each of the plurality of steps is executed by an apparatus designated by the job order. Next, in step S116, a determination as to whether or not the image processing is finished is performed. In a case where the processing result is obtained for all of the plurality of steps, the image processing is finished. The determination as to whether or not the image processing is finished is performed until the processing result is obtained for all of the steps.

A detailed procedure of the "image processing" will be described.

Figure 13:
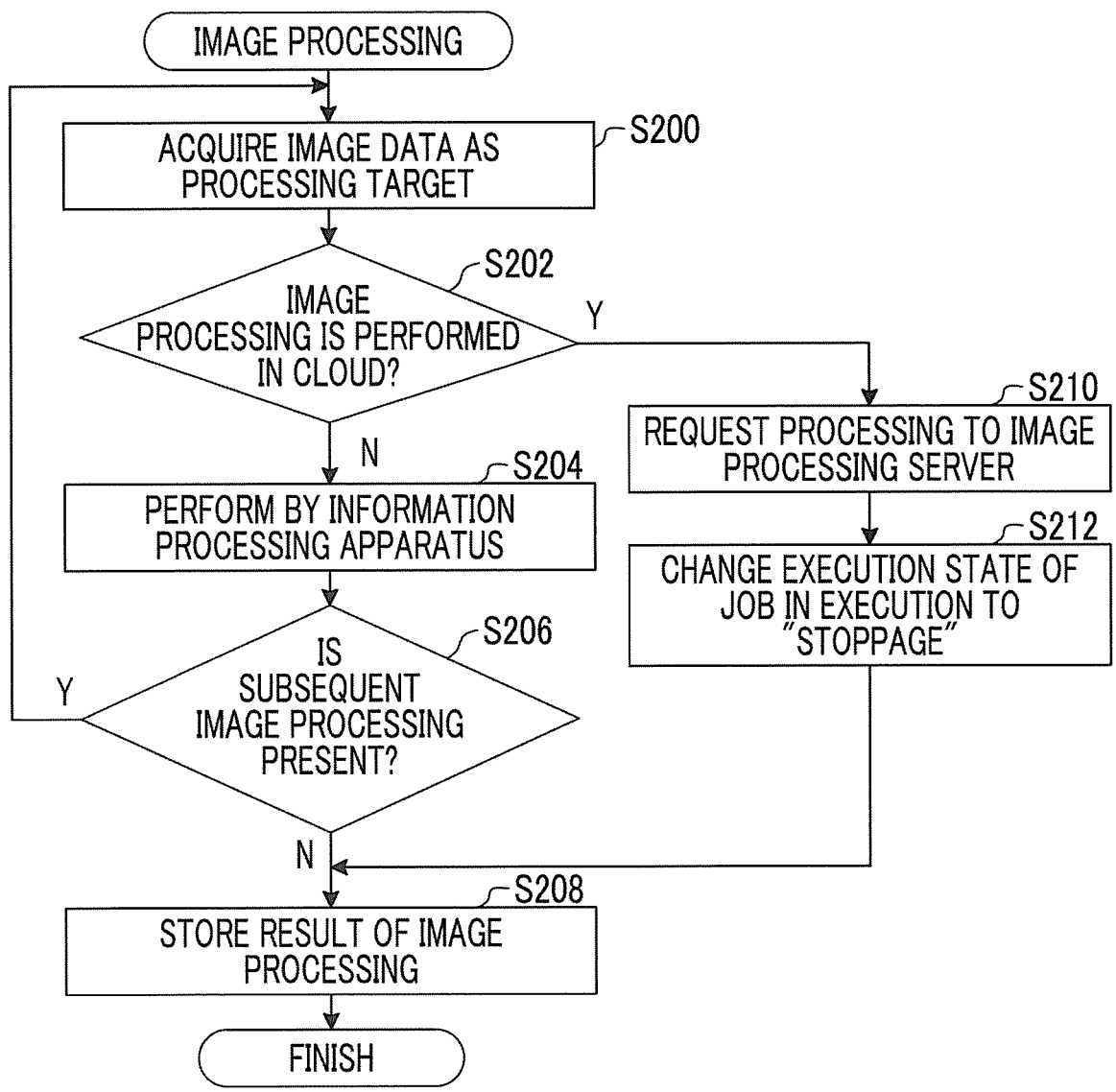
FIG. 13 is a flowchart illustrating one example of a flow of "image processing"

FIG. 13 is a flowchart illustrating one example of a flow of "image processing". First, in step S200, the image data as a processing target is acquired. Next, in step S202, a determination as to whether or not to perform the image processing in the cloud is performed. In a case where the image processing is not performed in the cloud, a transition is made to step S204. In step S204, the image processing is performed by the information processing apparatus.

Next, in step S206, a determination as to whether or not subsequent image processing is present is performed. In a case where the subsequent image processing is present, a return is made to step S200. In a case where the subsequent image processing is not present, a transition is made to step S208. In step S208, the result of the image processing is stored, and the routine is finished.

In step S202, in a case where it is determined that the image processing is performed in the cloud, a transition is made to step S210. In step S210, the request for the image processing is made to the image processing server in the cloud using the job order including the image data as a processing target, the job ID, and the requested process content. After the request for the image processing is completed, a transition is made to step S212. In step S212, the execution state of the transfer job in the in-execution state is changed to the "stoppage" state. FIG. 14 is a diagram illustrating an example of update of the management table. As illustrated in FIG. 14, the execution state of the transfer job in the in-execution state illustrated in FIG. 5 is changed to the "stoppage" state.

In a case where the transfer job is stopped, the result of the image processing obtained before the stoppage is stored in step S208, and the routine is finished. The stopped transfer job is resumed by a "transfer job resumption process" described later after the process finish notification is received from the image processing server.

FIG. 12 will be described again. In a case where the image processing is finished, next, a transition is made to step S118. In step S118, the result of the image processing is transferred to the document management server 30. In a case where the transfer to the document management server 30 is finished, the transfer job is finished. Next, in step S120, the job information of the finished transfer job is deleted from the management table.

Next, in step S122, a determination as to whether or not the transfer job in the resumption wait state is present is performed. In a case where the transfer job in the resumption wait state is present, a transition is made to step S126. In step S126, the execution state of the transfer job in the resumption wait state is changed to the "in-execution" state. In a case where the transfer job in the resumption wait state is not present, a transition is made to step S124.

In step S124, a determination as to whether or not the transfer job in the execution wait state is present is performed. In a case where the transfer job in the execution wait state is present, a transition is made to step S128. In step S128, the execution state of the transfer job in the execution wait state is changed to the "in-execution" state. As illustrated in FIG. 14, the execution state of the transfer job in the execution wait state illustrated in FIG. 5 is changed to the "in-execution" state. In a case where the transfer job in the execution wait state is not present, the routine is finished.

Transfer Job Resumption Process

Next, the transfer job resumption process will be described.

Figure 16:
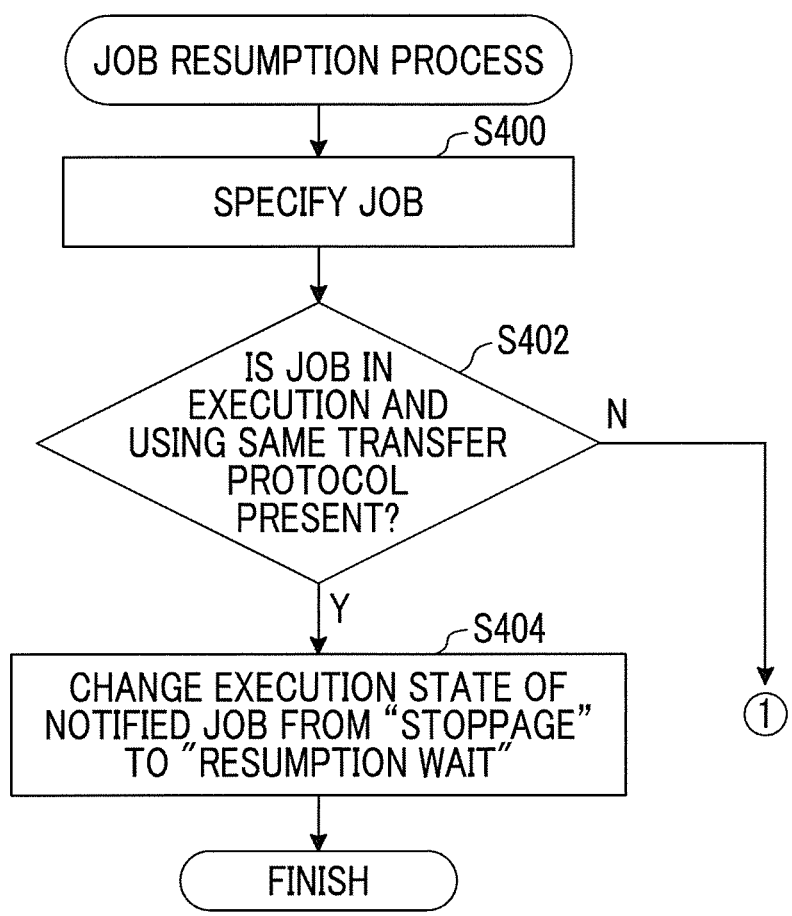
FIG. 16 is a flowchart illustrating one example of a flow of "transfer job resumption process"

FIG. 16 is a flowchart illustrating one example of a flow of "transfer job resumption process". A program of the transfer job resumption process is read from the ROM 12B and is executed by the CPU 12A of the information processing apparatus 10 (refer to FIG. 2). The program of the transfer job resumption process is started in a case where the process finish notification is received from the image processing server. As described above, the process finish notification includes the job ID, the success or failure of the image processing, and the URL of the storage destination at which the result of the image processing is stored.

In step S400, the transfer job for which the process finish notification is received is specified from the job ID. The execution state of the specified transfer job is the "stoppage" state. Next, in step S402, a determination as to whether or not the transfer job that is in the in-execution state and uses the same transfer protocol is present is performed. In a case where the transfer job that is in the in-execution state and uses the same transfer protocol is not present, a transition is made to step S114 in FIG. 12, and the image processing continues. The transfer job in the stoppage state is resumed.

The image data as a processing target of the image processing is acquired, and the subsequent step of the image processing is performed.

In a case where the transfer job that is in the in-execution state and uses the same transfer protocol is present, a transition is made to step S404. In step S404, the execution state of the transfer job in the stoppage state is changed to the "resumption wait" state, and the routine is finished. FIG. 17 is a diagram illustrating an example of update of the management table. As illustrated in FIG. 17, the execution state of the transfer job in the stoppage state illustrated in FIG. 14 is changed to the "resumption wait" state. The transfer job of which the execution state is the "resumption wait" state is executed earlier than the transfer job of which the execution state is the "execution wait" state.

Modification Example

The configurations of the information processing apparatus, the program, and the information processing system described in the exemplary embodiment are for illustrative purposes. The configurations may be changed without departing from the gist of the present invention.

In the exemplary embodiment, a case where the transfer control process is implemented by software is described. Alternatively, an equivalent process may be implemented by hardware.

In the exemplary embodiment, the subsequent transfer job that uses the same transfer protocol as the transfer job in the stoppage state may be executed earlier by interrupting the transfer job in the stoppage state. Alternatively, the interruption of the subsequent transfer job may be conditionally prohibited. For example, in a case where the server of the transfer destination designated by the IP address or the URL is identical, and the folder of the designated storage destination is also identical, the interruption of the subsequent transfer job is prohibited.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor that executes a first job and a second job in response to reception of the first job and the second job; and
controls state of the first job and the second job: wherein in a case where the first job includes transferring first data as a processing target to an external apparatus and receiving second data as a processing result from the external apparatus, the processor sets the first job to a stoppage state in response to completion of the transfer of the first data and sets the second job which uses a transfer protocol used in the first job to an execution available state.

2. The information processing apparatus according to claim 1,
wherein the processor stops use of a protocol used in the first job in response to the completion of the transfer of the first data to the external apparatus.

3. The information processing apparatus according to claim 2,
wherein the processor switches between a first mode in which control for setting the second job to the execution available state is performed in a case where a job that is being stopped and uses the same protocol is present, and a second mode in which control for setting the second job to an execution wait state is performed in a case where the job that is being stopped and uses the same protocol is present.

4. The information processing apparatus according to claim 3,
wherein the processor performs control for setting the second job to an execution wait state in a case where one transfer destination designated in the second job matches a transfer destination designated in the first job up to a folder name.

5. The information processing apparatus according to claim 2,
wherein the processor performs control for setting the second job to an execution wait state in a case where one transfer destination designated in the second job matches a transfer destination designated in the first job up to a folder name.

6. The information processing apparatus according to claim 2,
wherein the processor performs control for setting the first job to a resumption available state in a case where a notification indicating that processing of the first job that is being stopped is finished is received from the external apparatus.

7. The information processing apparatus according to claim 1,
wherein the processor stores the processing result of the first job before the stoppage before stopping use of a protocol used in the first job.

8. The information processing apparatus according to claim 7,
wherein the processor performs control for setting the second job to an execution wait state in a case where one transfer destination designated in the second job matches a transfer destination designated in the first job up to a folder name.

9. The information processing apparatus according to claim 1,
wherein the processor switches between a first mode in which control for setting the second job to the execution available state is performed in a case where a job that is being stopped and uses the same protocol is present, and a second mode in which control for setting the second job to an execution wait state is performed in a case where the job that is being stopped and uses the same protocol is present.

10. The information processing apparatus according to claim 9,
wherein the processor performs control for setting the second job to an execution wait state in a case where one transfer destination designated in the second job matches a transfer destination designated in the first job up to a folder name.

11. The information processing apparatus according to claim 1,
wherein the processor performs control for setting the second job to an execution wait state in a case where one transfer destination designated in the second job matches a transfer destination designated in the first job up to a folder name.

12. The information processing apparatus according to claim 1,
wherein the processor performs control for setting the first job to a resumption available state in a case where a notification indicating that processing of the first job that is being stopped is finished is received from the external apparatus.

13. The information processing apparatus according to claim 12,
wherein the processor performs control for resuming the first job in the resumption available state after the second job being executed is finished.

14. The information processing apparatus according to claim 13,
wherein the processor acquires the processing result of the external apparatus and executes a remaining job in a case where the first job in the stoppage state is resumed.

15. The information processing apparatus according to claim 12,
wherein the notification is received by electronic mail.

16. The information processing apparatus according to claim 15,
wherein the electronic mail is encrypted.

17. The information processing apparatus according to claim 15,
wherein the second data is attached to the electronic mail.

18. An information processing system comprising:
an information processing apparatus including
a processor that executes a first job and a second job in response to reception of the first job and the second job, and
controls state of the first job and the second job, in which
in a case where the first job includes transferring first data as a processing target to an external apparatus and receiving second data as a processing result from the external apparatus, the processor sets the first job to a stoppage state in response to completion of the transfer of the first data and sets the second job which uses a transfer protocol used in the first job to an execution available state; and
the external apparatus that executes a process requested from the information processing apparatus.

19. The information processing system according to claim 18, further comprising:
a storage device that stores a processing result transferred from the information processing apparatus.

20. A non-transitory computer readable medium storing a program causing a computer to function as:
a processor that executes a first job and a second job in response to reception of the first job and the second job; and
controls state of the first job and the second job: wherein
in a case where the first job includes transferring first data as a processing target to an external apparatus and receiving second data as a processing result from the external apparatus, the processor sets the first job to a stoppage state in response to completion of the transfer of the first data and sets the second job which uses a transfer protocol used in the first job to an execution available state.

* * * * *